US012768332B2

(12) United States Patent
Valcan et al.

(10) Patent No.: US 12,768,332 B2
(45) Date of Patent: Oct. 20, 2026

(54) WIND TURBINE POWER PLANT WITH PEAK POWER CONSUMPTION CONTROL

(71) Applicant: VESTAS WIND SYSTEMS A/S, Aarhus N (DK)

(72) Inventors: Dumitru-Mihai Valcan, Langå (DK); Artjoms Timofejevs, Aarhus N (DK); Per Lund, Kolding (DK); Nofel Dakhel, Åkarp (SE); Jundi Jia, Risskov (DK); Loránd Demsa, Aarhus V (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 257 days.

(21) Appl. No.: 18/697,630

(22) PCT Filed: Sep. 5, 2022

(86) PCT No.: PCT/DK2022/050178
§ 371 (c)(1),
(2) Date: Apr. 1, 2024

(87) PCT Pub. No.: WO2023/051884
PCT Pub. Date: Apr. 6, 2023

(65) Prior Publication Data

US 2026/0132768 A1 May 14, 2026

(30) Foreign Application Priority Data

Oct. 1, 2021 (DK) ................................. 202170486

(51) Int. Cl.
*F03D 7/02* (2006.01)
*F03D 7/04* (2006.01)

(52) U.S. Cl.
CPC ........... *F03D 7/026* (2013.01); *F03D 7/0284* (2013.01); *F03D 7/048* (2013.01); *F05B 2270/1074* (2013.01)

(58) Field of Classification Search
CPC ........ F03D 7/026; F03D 7/0284; F03D 7/048; F05B 2270/1074
See application file for complete search history.

(56) References Cited

U.S. PATENT DOCUMENTS

2018/0266391 A1 9/2018 Danielsen

FOREIGN PATENT DOCUMENTS

EP 2458205 A1 5/2012
EP 1752659 B1 3/2014
(Continued)

OTHER PUBLICATIONS

EP 1752659 translate (Year: 2007).*
(Continued)

*Primary Examiner* — Viet P Nguyen
(74) *Attorney, Agent, or Firm* — Patterson + Sheridan, LLP; Gero G. McClellan

(57) ABSTRACT

Controlling maximum power consumption of a power plant that includes a plurality of power generating units including a plurality of wind turbines, wherein the wind turbines are disconnected from an electrical power grid and connected to a power backup system. One operation includes setting a power consumption restriction mode of the wind turbines so that a predetermined power consuming activity is started or allowed to start, only for one selection of a plurality of selections of wind turbines of a group of wind turbines at one of a sequence of different start times or within one of non-overlapping start periods.

16 Claims, 2 Drawing Sheets

(56) References Cited

FOREIGN PATENT DOCUMENTS

| | | | |
|---|---|---|---|
| EP | 2795112 | B1 | 5/2017 |
| WO | 2011058170 | A1 | 5/2011 |
| WO | 2014090255 | A1 | 6/2014 |
| WO | 2021183120 | A1 | 9/2021 |

OTHER PUBLICATIONS

Danish Patent and Trademark Office, 1st Technical Examination including The Search Report and Search Opinion for Application PA 2021 70486 dated Feb. 21, 2022.

PCT International Search Report and Written Opinion of The International Searching Authority for Application PCT/DK2022/050178 dated Nov. 7, 2022 (Jul. 11, 2022).

* cited by examiner

WIND TURBINE POWER PLANT WITH PEAK POWER CONSUMPTION CONTROL

FIELD OF THE INVENTION

The invention relates to control of a power plant comprising a plurality of power generating units, particularly power plants which has one or more wind turbines and, particularly to handling wind turbine's consumption of power from a power backup system under conditions with no grid connection.

BACKGROUND OF THE INVENTION

Yawing activities of wind turbines are used to turn the nacelles so that they face the wind for the purpose of maximizing energy production, reducing wind turbines loads, e.g. in low wind situations or when wind turbines are paused, or for cable unwinding operations.

During situations where the wind turbines are disconnected from the grid, power to the wind turbines may be delivered from a power backup system such as a diesel generator. The power backup system has to be dimensioned according to the possible peak power consumption of the wind turbines. Since some power consuming activities such a yawing activities has a high initial peak power consumption, it is a problem that power backup system needs to be dimensioned according to the such peak power consumption values.

Accordingly, there is a need for improving control of power plants comprising wind turbines in order to handle yawing activities and other power consuming activities of the wind turbines in situations where the wind turbines are disconnected from the power grid.

SUMMARY

It is an object of the invention to improve control of power plants comprising wind turbines to alleviate one the above mentioned problems, and therefore to provide a method which provides improved handling of power consuming activities of wind turbines in a situation where the power plant is disconnected from the grid.

In a first aspect of the invention, a method for controlling maximum power consumption of a power plant which comprises a plurality of power generating units including a plurality of wind turbines, wherein the wind turbines are disconnected from an electrical power grid and connected to a power backup system, the method comprises

- setting a power consumption restriction mode of the wind turbines so that a predetermined power consuming activity of each the wind turbines is inhibited from starting, wherein the power consuming activity comprises one or more of a yawing activity, a cable untwist activity, a hydraulic activity, and a heating activity,
- determining a start sequence for a group of at least two of the wind turbines, wherein the start sequence comprises a sequence of different start times or non-overlapping starts periods for the predetermined power consuming activity,
- operating the wind turbines of the group according to the start sequence so that the predetermined power consuming activity is started or allowed to start, only for one selection of a plurality of selections of wind turbines of the group of wind turbines at one of the start times or within one of the start periods.

As an example, the power consuming activity is a yawing activity. At start-up during a transient period such as a period of 5 seconds, the yawing motor consumes a power which is significantly higher, such as five times higher, than the power consumed during steady state operation. Accordingly, if the yawing operation is started within short time for two or more wind turbines the total power consumption becomes very high, possibly leading to a fault if the power consumption is higher than the nominal power of the power backup system. Or oppositely, the power backup system will have to be dimensioned according to a worst case scenario where yawing systems are operated simultaneously for a plurality of wind turbines, even though the likelihood for such a situation may be low.

By operating power consuming activities of selections of wind turbines, where each selection may comprise one or more wind turbines, according to different start times or start periods, the peak, i.e. maximum, power consumption may be controlled. Thus, a situation with too many simultaneous yawing operations of different wind turbines may be avoided.

In the case where the power consuming activity is the start of a motor, such as the yaw drive, the startup may give rise to a inrush current. If a plurality of turbines starts yawing at the same time the combined power needed from the power back up system adds up and may even exceed the capabilities of the power backup system. Therefore it is advantageous to operate the wind turbines of the group according to the start sequence, such that the short period with high power demand due to the inrush current does not take place for all turbines in the power plant at the same time.

As an example of inhibiting the power consuming activity, the power consumption activity of the wind turbines can be deferred by a fixed or variable period of time. Thus, any start of the power consuming activity may be deferred or otherwise paused, e.g. until the start sequence is determined or until the operation according to the start sequence is started.

The number of wind turbines in a selection or which wind turbines are included in a selection may be determined based on a desired maximum power consumption and the peak power consumption or average peak power, e.g. the average peak power over a transient peak power period and/or the average peak power for different wind turbines. The desired maximum power consumption may be determined based on the nominal power of the power backup system.

According to an embodiment, the predetermined power consuming activity is started or allowed to start sequentially for the plurality of selections of the wind turbines according to the start sequence.

Since the power consuming activities are started sequentially, i.e. time shifted, overlap of succeeding transient high power periods of the power consuming activities of different wind turbines may be avoided.

According to an embodiment, the start sequence of different start times or starts periods is determined so that succeeding start times are separated at least by the start period, or so that a succeeding start period is located after an end of a preceding start period.

Accordingly, if the start period has duration equal to or longer than the transient high power period, different start times may be separated sufficiently to avoid overlap of the transient periods of different wind turbines. Similarly, succeeding start periods may be separated by a period have a duration equal to or longer than the start period.

According to an embodiment, operating the wind turbines so that the predetermined power consuming activity is started comprises sending a start request requesting the selection of one or more wind turbines to start at one of the start times or within one of the start periods.

According to an embodiment, operating the wind turbines so that the predetermined power consuming activity is allowed to start comprises sending a start permission allowing the selection of one or more wind turbines to start at one of the start times or within one of the start periods.

The start requests or start permissions may be generated and timed centrally from a central control unit and sent to wind turbines to start the power consuming activities or enable the power consuming activities to start. The start requests or the start permissions may be sent sequentially to the plurality of the selections of the wind turbines according to the start sequence. Thus, in order to react on the start requests or start permissions, the wind turbines must be configured to start or enabled to start the predetermined power consuming activity in response to receiving the start request or start permission.

According to an embodiment, the method comprises

- receiving requests from one or more of the wind turbines to perform the predetermined power consuming activity, and
- determining the start sequence based on the received requests.

The internal control systems of the wind turbines may generate such requests based on input from monitoring functions, e.g. a monitoring function configured to determine if yawing action is required or other power consuming activities based e.g. measurements of wind turbine specific parameters such as load values or environmental parameters such as wind parameters. Accordingly, the start sequence may only be generated for wind turbines having a need to start the power consuming activity.

According to an embodiment, operating the wind turbines comprises running the predetermined power consuming activity for a plurality of wind turbines of at least two of the selections simultaneously after the end of at least one start period.

Advantageously, the predetermined power consuming activity is allowed to run simultaneously for a plurality of selections of wind turbines since the determined start sequence ensures that the inrush periods of the predetermined power consuming activity do not take place simultaneously, i.e. do not overlap.

A second aspect of the invention relates to a method for determining a power capacity of a power backup system, wherein the power backup system is arranged to power a plurality of wind turbines during a situation where the wind turbines are disconnected from an electrical power grid, wherein the wind turbines are arranged to be controlled according to the method of first aspect.

According to an embodiment, the determination of the power capacity of a power backup system comprises

- determining a number of one or more wind turbines allowed to start the power consuming activity at the same time or within the same start period, and
- determining the power capacity of the power backup system based on said number and a peak start power consumption of the power consuming activity.

The peak start power consumption may be an average power consumed during the transient peak power period or a fraction thereof.

A third aspect of the invention relates to a central controller for controlling power consumption of a power plant which comprises a plurality of power generating units including a plurality of wind turbines, wherein the power plant is connected to a power backup system and where the central controller is arranged to perform the method according to the first aspect.

A fourth aspect of the invention relates to a power plant which comprises a plurality of power generating units including at least one wind turbine and the central controller according to the second aspect.

A first aspect of the invention relates to a computer program product comprising software code adapted to control a power plant when executed on a data processing system, the computer program product being adapted to perform the method of any of the first and second aspects.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION

Figure 1:
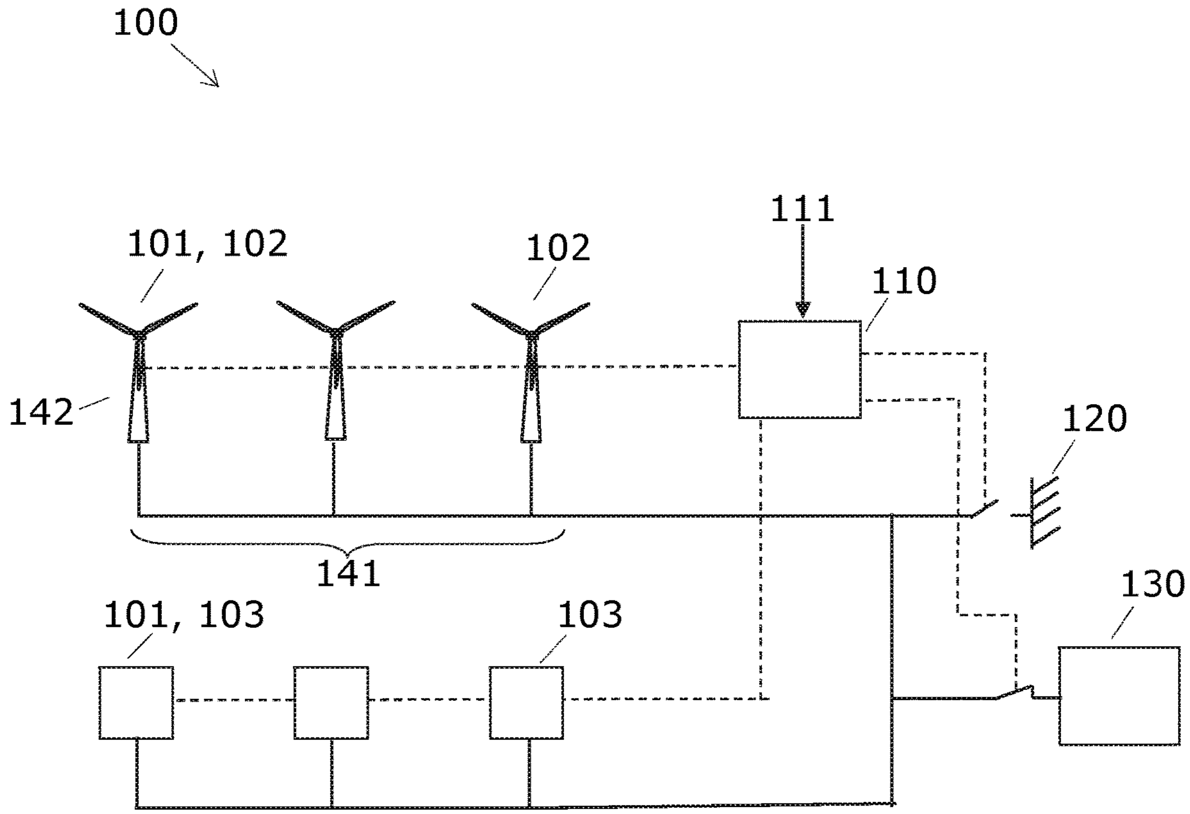
FIG. 1 shows a power plant including a plurality of power generating units and wind turbines.

FIG. 1 shows a power plant 100 which comprises a plurality of power generating units 101 such as wind turbines 102. The power plant 100 may be a renewable power plant comprising only renewable power generating units. In general, the power generating units 101 may consist of different types of power generating units, e.g. different types of renewable power generating units such as solar power units 103 (e.g. photovoltaic solar panels) and wind turbines. According to an embodiment, the power producing units 101 comprises a plurality of wind turbines 102. The power plant 100 may comprise at least two such as three power generating units 101 of the same or different types, i.e. a mix, of different types of power generating units. For example, the power plant 100 may consist only of wind turbines 102 and in this case at least two or three wind turbines 102. In another example, the power plant 100 comprises at least two wind turbines 102 and at least one or two other power generating units 101.

The wind turbine 102 may comprise a tower and a rotor with at least one rotor blade, such as three blades. The rotor is connected to a nacelle which is mounted on top of the tower and being adapted to drive a generator situated inside the nacelle. The rotor is rotatable by action of the wind. The wind induced rotational energy of the rotor blades is transferred via a shaft to the generator. Thus, the wind turbine is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid. The generator of the wind turbine 102 is controllable to produce power corresponding to power set-points provided by the central controller 110. For wind turbines, the output power may be adjusted according to the power set-point by adjusting the pitch of the rotor blades or by controlling the power converter to adjust the power production.

The power plant 100 is connectable with an electrical power grid 120 for supplying power from the power generating units 101 to the electrical power grid.

The power plant 100 or only the wind turbines 102 are connectable with a power backup system 130 such as a diesel generator, electrical batteries or other backup system capable of suppling power to the power plant 100, or at least to the wind turbines 102. For example, in a situation where the power plant 100 is disconnected from the grid 120, the power backup system 130 may supply power to the wind turbines for powering critical power consuming activities of the wind turbines.

At least the wind turbines 102 of the power plant is controlled by a central controller 110. The central controller 110 is arranged to control power generation from the wind turbines 102 according to a power plant reference which defines the desired power to be supplied to the grid from the power plant 100. The power plant reference may be provided via input 111.

Furthermore, the central controller is arranged to set operational modes of the wind turbines 102 such as controlling the wind turbines to operate in a peak power reduction mode which controls start times of one or more power consuming activities of the wind turbines and thereby limits the peak, i.e. maximum, power consumption from the power backup system 130. The peak power reduction mode may be relevant in situations where the wind turbines are disconnected from the grid 120 so that only the power backup system 130 can deliver power to the wind turbines 102.

The wind turbines may be in a state where they do not produce power or are paused, e.g. in situations with low wind. The paused state of a wind turbine can be any state where the wind turbine is not producing power. In such states the wind turbines may be disconnected from the grid.

FIG. 1 shows the power plant 100 in a situation where it is disconnected from the grid 120 via a switch and connected to the power backup system 130 via another switch. The switches may be controlled by the central controller 110.

In a power plant which is only connected to the power backup system 130, but which is not operable in the peak power reduction mode, a situation may occur where a plurality of yaw systems start yawing at the same time or at least within a few seconds. Due to an initial transient inrush current consumed by the plurality yaw motors stating at the same time, a peak power is drawn from the power backup system 130. The yaw motor starting transient may last for several seconds, such as up to 5 seconds, and the power consumption during the transient period may be e.g. five times higher than the steady state power consumption. Accordingly, if two or more wind turbines start yawing within the same transient period, the total power consumption adds up to a value which is significantly larger than the sum of power consumed during steady state yawing.

In a power plant 100 configured according to an embodiment of the present invention, when wind turbines are operated in a peak power reduction mode, one or more power consuming activities may be inhibited from starting autonomously or otherwise prevented from starting autonomously. Examples of such inhibited power consuming activities includes yawing, cable untwisting, hydraulic activities, lubrication, cooling and heating activities. The examples of inhibited power consuming activities may be activities which are required to be in a state where they can be powered up and thereby consume power from the power backup system 130. For example, the yawing system may be required to be started, at least within a known period of time, for the purpose of performing cable untwisting or yawing to face the wind e.g. for the purpose of minimizing tower and blade loads due to oscillations, or for the purpose of being ready to produce power when the wind speed increases. Power consumption characteristics of such power consuming activities may include an initial power transient or inrush power or current, followed by a steady state current consumption. The power transient may be due to the initial energization of electromagnetic motors which demand an initial inrush current. The power transient may be significantly higher than the steady state power, e.g. the power transient may be 1.5 times higher, such as 2 times higher or more than the steady state power.

When the turbine is yawing to face the wind, it likely yaws continuously to one direction which can cause cables inside the tower to get twisted. The cables of the wind turbine has a limit on the twisting capacity. Therefore, the wind turbine may be required to perform an untwisting process by controlling the yaw system to perform a nacelle rotation. The untwisting process is preferably performed at low wind speeds, e.g. to avoid loss of power production or to avoid high loads that could otherwise be generated during high wind speeds.

Other power consuming activities may not be inhibited since they are essential for the continued operation of the wind turbine. Examples of such essential activities which should not be shut down includes communication, load and wind monitoring.

A plurality of wind turbines 102 constitutes a group 141 of wind turbines, and selections 142 of wind turbines within the group may be made wherein each selection 142 comprises one or more wind turbines. The selections may be made manually, based on characteristics of the wind turbines such as load histories, based on environmental data such as actual or historical wind data.

Figure 2A:
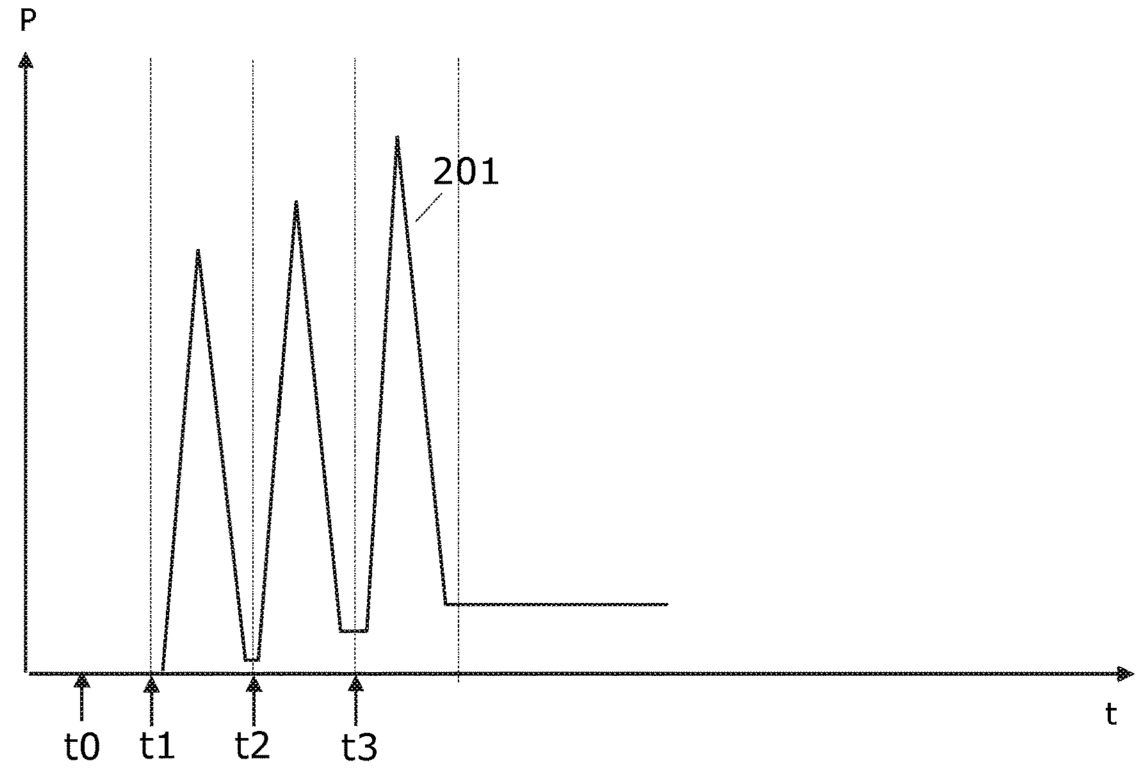
FIGS. 2A-B illustrate methods for controlling the maximum power consumption of a plurality of wind turbines connected to an power backup system.
Figure 2B:
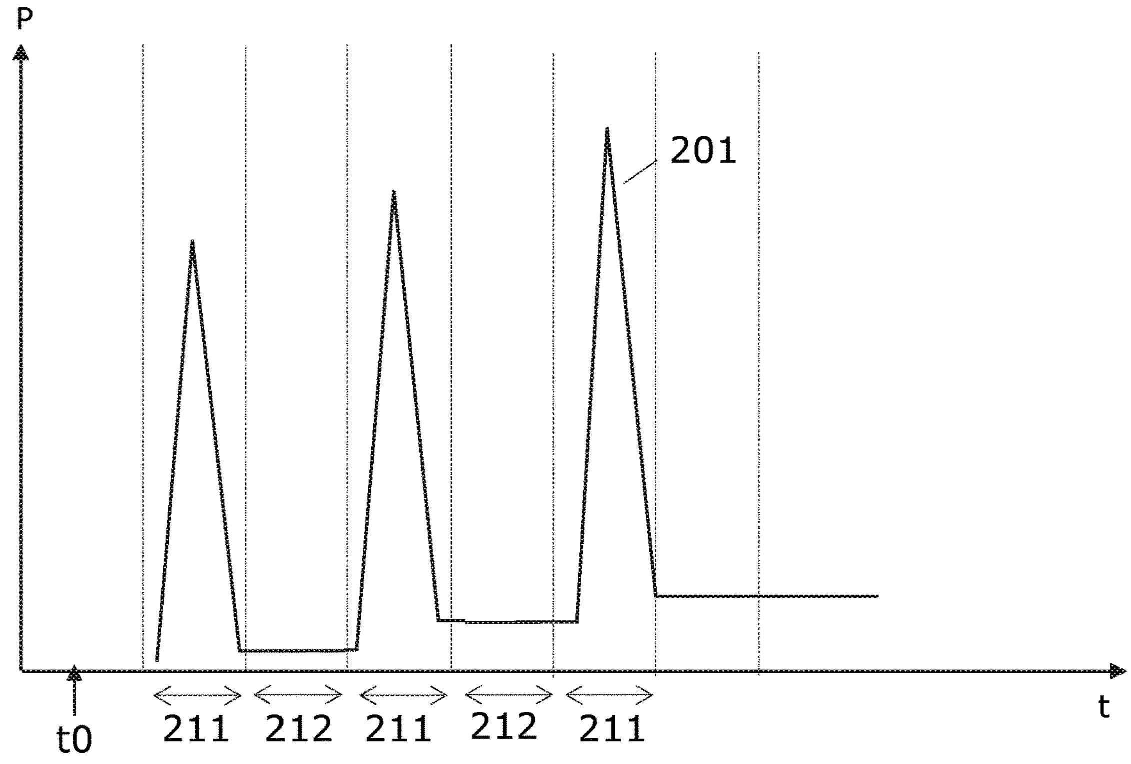

FIGS. 2A and 2B illustrate methods for controlling the maximum power consumption of a plurality of wind turbines connected to an power backup system 130. Curve 201 illustrates the sum of powers of power consuming activities started sequentially on different wind turbines 102 or different selections 142 of wind turbines.

The first power peak 221 between t1 and t2, or in the first start period 211, is the transient power consumption due to the inrush current of the power consuming activity of a first selection of one or more wind turbines. Near the end of the period between t1 and t2 or the first start period 211, the transient power 221 is reduced to a steady state power which continues as long as the power consuming activity of a first selection is running. Shortly after t2, the power consuming activity of a second selection of one or more wind turbines is started which leads to the second transient power peak 222 between t2 and t3 or in the second start period 211. The power consumption of the power consuming activity of the second selection, which also continues after t3 as a steady state power, is added to the power consumption of the first selection. Shortly after t3, the power consuming activity of a third selection of one or more wind turbines is started which leads to the third transient power peak 223. The power consumption of the power consuming activity of the third selection, which also continues as a steady state power, is added to the power consumption of the first and second selections. Since the start times of the power consuming activity of the first to third selections have been scheduled to different start times or to be allowed within different start periods, the peak power consumptions 221-223 do not overlap in time, but are scheduled to take place sequentially or so that the peaks consumptions 221-223 do not overlap.

Thus, whereas the scheduling ensures that the peak power consumptions do not overlap, the steady state periods of the scheduled power consuming activity are allowed to take place simultaneously for a plurality of the different selections of wind turbines. For example, as shown in FIGS. 2A and 2B, the predetermined power consuming activity of the first and second selections of wind turbines are operated simultaneously after t2 or in the second start period 211, and the predetermined power consuming activity of the first to third selections are operated simultaneously after t3 or in the third of the start periods 211.

Initially at to, a power consumption restriction mode is set for one or more wind turbines so that a predetermined power consuming activity, e.g. a yawing activity, of each the wind turbines is inhibited from starting.

A start sequence for the predetermined power consuming activity for a plurality of wind turbines is obtained, e.g. determined by the central controller 110 or provided manually. The start sequence comprises a sequence of different start times t1, t2, t3 and/or non-overlapping starts periods 211.

In order to allow the inhibited power consuming activity to run, the wind turbines 102 are operated, e.g. by the central controller 110, according to the start sequence so that the power consuming activity for one selection 142 of wind turbines, e.g. one wind turbine 102, is started at or near the start times t1, t2, t3 or are allowed to start within the starts periods 211.

The selection 142 of wind turbines may include one or more wind turbines of the group 141 of wind turbines. If two power consuming activities are allowed to start at the same time and thereby consume transient power at the same time, a selection of wind turbines may include two wind turbines.

For example, the predetermined power consuming activity for a wind turbine or a selection of wind turbines may be started by sending a start request to the wind turbine or selection of wind turbines requesting the power consuming activity to start at one of the start times t1, t2, t3 or to start within one of the start periods 211.

The start times t1, t2, t3 may be separated so that the time between successive start times t1, t2 is long enough to ensure that the transient power consuming period has ended before a subsequent start time t2. For example, the separation time may be equal to the length of the start period 211.

By defining a start period 211, the control system of a wind turbine can autonomously determine if the power consuming activity is required to start. For example, a start period 211 may have a duration of a few seconds such as a fixed duration within 1 to 100 seconds. To ensure that the transient period of peak power consumption e.g. due to inrush current of the yaw drive/motor, started within a start period 211 has ended before the subsequent power consuming activities are started within the subsequent start period 211, a delay period 212 with a suitable duration such as the duration of a transient peak-consumption period may be defined between any successive start periods 211.

The control of the start sequence of the predetermined power consuming activities may involve sending a start permission such as an enabling signal which merely enables or allows the selection 142 of one or more wind turbines to start at one of the start times t1-t3 or within one of the start periods 211. Thus, the power consuming activity may only be started, e.g. if a control system of the wind turbine 102 requires a start of the power consuming activity.

Alternatively, the control of the start sequence of the predetermined power consuming activities may involve sending a start request which merely requests the selection 142 of one or more wind turbines to start at one of the start times t1-t3 or within one of the start periods 211.

The start requests or the start permissions may be sent sequentially to the plurality of the selections of the wind turbines according to the start sequence, or the start requests or the start permissions may be sent in one operation, e.g. when the power consumption restriction mode is set at t0 or other time before or at the first start time t1.

It is understood that the wind turbines such as wind turbine control systems are configured so that they are able to start or enabled to start the predetermined power consuming activity in response to receiving the start request or start permission, respectively.

The wind turbines may send requests to the central controller 110 to start the inhibited power consuming activity. Thus, the central controller 110 may be configured to determine the start sequence based on polling requests from the wind turbines. The handling of requests, e.g. the ordering of requests in the start sequence, may be determined based on auxiliary data to as the wind speed or tower loads for a given wind turbine.

Alternatively, the start sequence may be a predetermined sequence, e.g. a sequence provided by an operator of the power plant 100.

The power backup system is arranged to power a plurality of wind turbines during a situation where the wind turbines are disconnected from an electrical power grid. Accordingly, the power backup system should be dimensioned to be able to provide a worst case maximum power for a given period of time. Based on the method described for controlling maximum power consumption of a power plant 100, the number of one or more wind turbines allowed to start a given power consuming activity at the same time is known or may be determined.

Equivalently, since the peak power consumption of the power consuming activity is known, the total power consumption is known or may be determined. Based on this knowledge, the required power capacity of the power backup system can be determined, e.g. based on number of power consuming activities allowed to run simultaneously and a peak power consumption, such as the average peak power consumption during a transient start period of the power consuming activity. Accordingly, the method for controlling maximum power consumption of a power plant can be utilized in a method for determining a required power capacity of a power backup system.

The above described method steps may be coordinated and performed by the central control system 110 being part of the power plant 100 or the method steps or some of them may be performed by other systems such as decentral control systems. The control systems may be implemented as algorithms and executed by one or more computers.

The invention claimed is:

1. A method for controlling maximum power consumption of a power plant which comprises a plurality of power generating units including a plurality of wind turbines, wherein the wind turbines are disconnected from an electrical power grid and connected to a power backup system, the method comprises:

setting a power consumption restriction mode of the wind turbines so that a predetermined power consuming activity of each the wind turbines is inhibited from starting, wherein the power consuming activity comprises one or more of a yawing activity, a cable untwist activity, a hydraulic activity, and a heating activity, determining a start sequence for a group of at least two of the wind turbines, wherein the start sequence comprises a sequence of different start times or non-overlapping starts periods for the predetermined power consuming activity, operating the wind turbines of the group according to the start sequence so that the predetermined power consuming activity is started or allowed to start, only for one selection of a plurality of selections of wind turbines of the group of wind turbines at one of the start times or within one of the start periods, and wherein operating the wind turbines comprises running the predetermined power consuming activity for a plurality of wind turbines of at least two of the selections simultaneously after the end of at least one start period.

2. The method of claim 1, wherein the predetermined power consuming activity is started or allowed to start sequentially for the plurality of selections of the wind turbines according to the start sequence.

3. The method of claim 1, comprising determining the start sequence of different start times or starts periods, so that succeeding start times are separated at least by the start period, or so that a succeeding start period is located after an end of a preceding start period.

4. The method of claim 1, wherein operating the wind turbines so that the predetermined power consuming activity is started comprises sending a start request requesting the selection of one or more wind turbines to start at one of the start times or within one of the start periods.

5. The method of claim 4, wherein the start requests are sent sequentially to the plurality of the selections of the wind turbines according to the start sequence.

6. The method of claim 4, wherein the wind turbines are configured to start or enabled to start the predetermined power consuming activity in response to receiving the start request or start permission.

7. The method of claim 1, wherein operating the wind turbines so that the predetermined power consuming activity is allowed to start comprises sending a start permission allowing the selection of one or more wind turbines to start at one of the start times or within one of the start periods.

8. The method of claim 1, comprising receiving requests from one or more of the wind turbines to perform the predetermined power consuming activity, and determining the start sequence based on the received requests.

9. A method for determining a power capacity of a power backup system arranged to power a plurality of wind turbines during a situation where the wind turbines are disconnected from an electrical power grid, the method comprising: controlling the wind turbines according to the method of claim 1.

10. The method of claim 9, further comprising:

determining a number of one or more wind turbines allowed to start the power consuming activity at the same time or within the same start period, and determining the power capacity of the power backup system based on said number and a peak start power consumption of the predetermined power consuming activity.

11. A central controller for controlling power consumption of a power plant which comprises a plurality of power generating units including a plurality of wind turbines, and where the central controller is arranged to perform an operation, comprising, while the wind turbines are disconnected from an electrical power grid and connected to a power backup system:

setting a power consumption restriction mode of the wind turbines so that a predetermined power consuming activity of each the wind turbines is inhibited from starting, wherein the power consuming activity comprises one or more of a yawing activity, a cable untwist activity, a hydraulic activity, and a heating activity;

determining a start sequence for a group of at least two of the wind turbines, wherein the start sequence comprises a sequence of different start times or non-overlapping starts periods for the predetermined power consuming activity; and operating the wind turbines of the group according to the start sequence so that the predetermined power consuming activity is started or allowed to start, only for one selection of a plurality of selections of wind turbines of the group of wind turbines at one of the start times or within one of the start periods, and wherein operating the wind turbines comprises running the predetermined power consuming activity for a plurality of wind turbines of at least two of the selections simultaneously after the end of at least one start period.

12. The central controller according to claim 11, wherein the predetermined power consuming activity is started or allowed to start sequentially for the plurality of selections of the wind turbines according to the start sequence.

13. The central controller according to claim 11, wherein the operation further comprises determining the start sequence of different start times or starts periods, so that succeeding start times are separated at least by the start period, or so that a succeeding start period is located after an end of a preceding start period.

14. A computer program product comprising software code which, when executed on a data processing system, programs a central controller to perform an operation to control power consumption of a power plant while a plurality of wind turbines of the power plant are disconnected from an electrical power grid and connected to a power backup system; the operation comprising:

setting a power consumption restriction mode of the wind turbines so that a predetermined power consuming activity of each the wind turbines is inhibited from starting, wherein the power consuming activity comprises one or more of a yawing activity, a cable untwist activity, a hydraulic activity, and a heating activity;

determining a start sequence for a group of at least two of the wind turbines, wherein the start sequence comprises a sequence of different start times or non-overlapping starts periods for the predetermined power consuming activity; and operating the wind turbines of the group according to the start sequence so that the predetermined power consuming activity is started or allowed to start, only for one selection of a plurality of selections of wind turbines of the group of wind turbines at one of the start times or within one of the start periods, and wherein operating the wind turbines comprises running the predetermined power consuming activity for a plurality of wind turbines of at least two of the selections simultaneously after the end of at least one start period.

15. The computer program product according to claim 14, wherein the predetermined power consuming activity is started or allowed to start sequentially for the plurality of selections of the wind turbines according to the start sequence.

16. The computer program product according to claim 14, wherein the operation further comprises determining the start sequence of different start times or starts periods, so that succeeding start times are separated at least by the start period, or so that a succeeding start period is located after an end of a preceding start period.

* * * * *